US012129633B2

(12) United States Patent
Shade et al.

(10) Patent No.: US 12,129,633 B2
(45) **Date of Patent: *Oct. 29, 2024**

(54) HANDHELD SHOWERHEAD WITH PUSH-BUTTON RELEASE MECHANISM

(71) Applicant: HOMEWERKS WORLDWIDE, LLC, Lake Bluff, IL (US)

(72) Inventors: Rob Shade, Aurora, OH (US); Viorel Berlovan, Jr., Medina, OH (US)

(73) Assignee: HOMEWERKS WORLDWIDE, LLC, Lake Bluff, IL (US)

( * ) Notice: Subject to any disclaimer, the term of this patent is extended or adjusted under 35 U.S.C. 154(b) by 137 days.

This patent is subject to a terminal disclaimer.

(21) Appl. No.: 17/635,431

(22) PCT Filed: Nov. 4, 2020

(86) PCT No.: PCT/US2020/058792

§ 371 (c)(1),
(2) Date: Feb. 15, 2022

(87) PCT Pub. No.: WO2021/096735

PCT Pub. Date: May 20, 2021

(65) Prior Publication Data

US 2022/0364342 A1 Nov. 17, 2022

Related U.S. Application Data

(60) Provisional application No. 63/031,728, filed on May 29, 2020, provisional application No. 62/934,072, filed on Nov. 12, 2019.

(51) Int. Cl.
*E03C 1/06* (2006.01)
*B05B 1/18* (2006.01)
(Continued)

(52) U.S. Cl.
CPC .................. *E03C 1/06* (2013.01); *B05B 1/18* (2013.01); *B05B 15/62* (2018.02); *E03C 1/0409* (2013.01)

(58) Field of Classification Search
CPC ......... B05B 15/62; B05B 1/18; E03C 1/0408; E03C 1/0409; E03C 1/06
See application file for complete search history.

(56) References Cited

U.S. PATENT DOCUMENTS 3,865,310 A 2/1975 Elkins et al.
6,446,278 B1 9/2002 Lin
(Continued)

FOREIGN PATENT DOCUMENTS

CN 2474231 Y 1/2002
CN 2520207 Y 11/2002
(Continued)

OTHER PUBLICATIONS

International Search Report and Written Opinion, dated Dec. 14, 2020, in connection with PCT/US2020/058792, filed Nov. 4, 2020.
(Continued)

*Primary Examiner* — Qingzhang Zhou
*Assistant Examiner* — Joel Zhou
(74) *Attorney, Agent, or Firm* — Cozen O'Connor

(57) ABSTRACT

A handheld showerhead assembly including a handheld showerhead and a receiver to which the handheld showerhead is releasably securable. The handheld showerhead includes a push-button on a handle portion thereof for releasing the handheld showerhead from the receiver. The handheld showerhead is maintained securely engaged with the receiver until the push-button is depressed to permit removal of the handheld showerhead from the receiver. Cooperating magnetic components attract the handheld showerhead to the receiver.

10 Claims, 8 Drawing Sheets

(51) Int. Cl.
*B05B 15/62* (2018.01)
*E03C 1/04* (2006.01)

(56) References Cited

U.S. PATENT DOCUMENTS

| | | | |
|---|---|---|---|
| 6,594,832 B2 | 7/2003 | Yang | |
| 7,665,676 B2 | 2/2010 | Lev | |
| 7,753,079 B2 | 7/2010 | Nelson | |
| 7,793,987 B1 | 9/2010 | Busch et al. | |
| 7,837,133 B2 | 11/2010 | Zhou | |
| 7,909,061 B2 | 3/2011 | Nelson | |
| 8,387,661 B2 | 3/2013 | Nelson | |
| 8,413,686 B2 | 4/2013 | Ko | |
| 8,567,430 B2 | 10/2013 | Allen et al. | |
| 9,410,309 B2 | 8/2016 | Sharratt et al. | |
| 9,438,977 B2 | 9/2016 | Wang et al. | |
| 9,849,471 B2 | 12/2017 | Lin et al. | |
| 9,919,331 B2 * | 3/2018 | Scheffer | E03C 1/06 |
| 10,046,340 B2 | 8/2018 | Lin et al. | |
| 10,046,341 B2 | 8/2018 | Wu et al. | |
| 10,060,105 B2 | 8/2018 | Lin et al. | |
| 10,150,121 B2 | 12/2018 | Lin et al. | |
| 10,399,094 B2 | 9/2019 | Huffington et al. | |
| 10,500,596 B2 | 12/2019 | Lin et al. | |
| 10,533,309 B2 | 1/2020 | Genord et al. | |
| 10,618,065 B2 | 4/2020 | Lin et al. | |
| 10,695,786 B2 | 6/2020 | Mercado | |
| 10,821,449 B2 | 11/2020 | Lin et al. | |
| 11,247,223 B2 * | 2/2022 | Huang | B05B 15/68 |
| 2003/0041372 A1 | 3/2003 | Yang | |
| 2006/0130229 A1 | 6/2006 | Kollmann et al. | |
| 2007/0022528 A1 | 2/2007 | Gilbert | |
| 2009/0007330 A1 | 1/2009 | Genord et al. | |
| 2010/0043135 A1 | 2/2010 | Patterson et al. | |
| 2010/0170587 A1 | 7/2010 | Kaess | |
| 2013/0219613 A1 | 8/2013 | Ojea | |
| 2013/0299608 A1 | 11/2013 | Spangler et al. | |
| 2013/0320116 A1 | 12/2013 | Jonte et al. | |
| 2015/0122913 A1 | 5/2015 | Wang et al. | |
| 2016/0236223 A1 | 8/2016 | Scheffer et al. | |
| 2017/0014849 A1 | 1/2017 | Gao et al. | |
| 2017/0259279 A1 | 9/2017 | Lin et al. | |
| 2018/0193851 A1 | 7/2018 | L'Henaff et al. | |
| 2019/0176170 A1 | 6/2019 | Lee et al. | |
| 2020/0109542 A1 | 4/2020 | Mavinahally et al. | |
| 2020/0122166 A1 | 4/2020 | Farley | |
| 2020/0238306 A1 | 7/2020 | Su et al. | |
| 2020/0360947 A1 | 11/2020 | Guthrie et al. | |

FOREIGN PATENT DOCUMENTS

| | | | |
|---|---|---|---|
| CN | 202238465 U | 5/2012 | |
| CN | 202343352 U | 7/2012 | |
| CN | 102873000 A | 1/2013 | |
| CN | 103551272 | 2/2014 | |
| CN | 103551272 A * | 2/2014 | B05B 1/18 |
| CN | 203470251 U | 3/2014 | |
| CN | 203525935 U | 4/2014 | |
| CN | 203960964 U | 11/2014 | |
| CN | 204703237 U | 10/2015 | |
| CN | 204724343 | 10/2015 | |
| CN | 105750101 A | 7/2016 | |
| CN | 106122534 A | 11/2016 | |
| CN | 106269322 | 1/2017 | |
| CN | 107260038 A | 10/2017 | |
| CN | 107747336 A | 3/2018 | |
| CN | 107812623 A | 3/2018 | |
| CN | 207295860 | 5/2018 | |
| CN | 207970997 U | 10/2018 | |
| CN | 110144999 | 8/2019 | |
| CN | 209808145 U | 12/2019 | |
| CN | 209866365 U | 12/2019 | |
| CN | 210125489 U | 3/2020 | |
| CN | 210357616 U | 4/2020 | |
| CN | 111167652 A | 5/2020 | |
| CN | 210631123 U | 5/2020 | |
| CN | 111604203 A | 9/2020 | |
| CN | 211613129 U | 10/2020 | |
| DE | 199300418 U1 | 5/1993 | |
| DE | 102007011601 A1 | 9/2008 | |
| EP | 2096215 B1 | 4/2015 | |
| EP | 3309306 B1 | 10/2019 | |
| JP | 2080173 U | 6/1990 | |
| JP | 9075253 A | 3/1997 | |
| JP | 2003088480 A | 3/2003 | |
| JP | 2003245217 A | 9/2003 | |
| KR | 20100065848 A | 6/2010 | |
| KR | 484447 Y1 | 9/2017 | |
| WO | WO 2008107101 A1 | 9/2008 | |
| WO | WO 2008107102 A1 | 9/2008 | |
| WO | WO 2008107103 A1 | 9/2008 | |
| WO | WO 2009019491 | 2/2009 | |
| WO | WO 2020/072368 | 4/2020 | |

OTHER PUBLICATIONS

International Preliminary Report on Patentability, dated Nov. 20, 2021, in connection with PCT/US2020/058792, filed Nov. 4, 2020.

International Search Report and Written Opinion, dated Jul. 7, 2021, in connection with PCT/2021/031738, filed May 11, 2021.

Office Action dated Dec. 12, 2023 issued in U.S. Appl. No. 17/636,377.

Office Action dated Jan. 17, 2024, issued in Chinese Patent Application No. 202080070774.5.

* cited by examiner

HANDHELD SHOWERHEAD WITH PUSH-BUTTON RELEASE MECHANISM

CROSS REFERENCE TO RELATED PATENTS AND APPLICATIONS

The present application claims priority to U.S. Provisional Patent Application Ser. No. 62/934,072, filed on Nov. 12, 2019, and U.S. Provisional Patent Application Ser. No. 63/031,728, filed on May 29, 2020, the entire contents of each application being incorporated herein by reference.

FIELD

The present exemplary embodiments relate to showerheads. It finds particular application in conjunction with a handheld shower and will be described with particular reference thereto. However, it is to be appreciated that the present exemplary embodiments are also amenable to other like applications.

BACKGROUND

Handheld showers and wands are popular for allowing a user more flexibility when showering. Typical handheld showers often include a bracket that is configured to support the handheld shower on or adjacent an outlet pipe when not being actively manipulated by a user. In one example, a handle of a handheld shower is configured to be received in a bracket that is mounted to the outlet pipe. A user can shower with the handheld shower supported in the bracket and serving as a conventional fixed showerhead or remove the handheld shower from the bracket for showering in a handheld mode.

Past handheld shower mounts have been difficult for users to operate, particularly when the user is in the midst of showering and wishes to switch between the fixed showerhead mode and the handheld shower mode. In many cases, proper alignment of the handheld shower with the bracket is not as easy as it could be when returning the handheld showerhead to the bracket. In other cases, a user may fail to properly or fully seat the handheld showerhead in the bracket resulting in the handheld showerhead drooping or coming free from the bracket.

Another issue that can arise with past handheld showers is the inadvertent dislodging of the handheld shower from its mount during showering. This can result in the handheld shower dropping to the floor of the shower and causing damage to the shower enclosure or handheld showerhead, or possibly impacting a user's foot. Handheld shower mounts that employ magnetic mounts or snap fit mounts are particularly prone to inadvertent dislodging as such designs do not generally provide a positive locking mechanism to secure the handheld shower in its mounted configuration.

BRIEF DESCRIPTION

Aspects of the present disclosure are directed to a handheld showerhead assembly including a handheld showerhead and a receiver to which the handheld showerhead is releasably securable. The handheld showerhead includes a push-button on a handle portion thereof for releasing the handheld showerhead from the receiver.

In accordance with one aspect, a handheld shower assembly comprises a handheld showerhead, a receiver mountable to an outlet pipe; and a coupling mechanism for releasably coupling the handheld shower with the receiver. The coupling mechanism includes a male component adapted to be received in a female component, the male component being associated with the receiver and the female component being associated with the handheld showerhead, and the handheld showerhead includes a push-button release mechanism.

The push-button release mechanism can include a pair of jaws configured to engage a surface of the male component to restrict separation of the handheld showerhead from the receiver, the jaws being movable between a closed position and an open position, and/or a biasing member for biasing the pair of jaws towards the closed position. The push-button release mechanism can include a button supported for reciprocating movement by a handle portion of the handheld showerhead. A flow tube for supplying water can be supported in the handheld showerhead, and the flow tube can pass through an opening in the push-button release mechanism. The push-button release mechanism can include a first linkage having a pair of spaced-apart bars at least partially forming the opening through which the flow tube passes. The push-button release mechanism can be coextensive along a major portion of its length with the flow tube. The push-button release mechanism can include an arm supported in the hand-held showerhead for reciprocating movement in response to depression of the button. A rear surface of the button can be concave such that its shape corresponds to a shape of a surface of the flow tube, whereby the button is configured to engage the corresponding surface of the flow tube when fully depressed thereby limiting further depression of the button. The button can be on a front side of the handle portion of the handheld showerhead. wherein a rear surface of the button is concave such that its shape corresponds to a shape of a surface of the flow tube, whereby the button is configured to engage the corresponding surface of the flow tube when fully depressed thereby limiting further depression of the button. The handheld showerhead can include a plurality of nozzles, and the button can be on a front side of the handle portion of the handheld showerhead facing in a common direction as the plurality of nozzles. The coupling mechanism can include cooperating magnetic components for attracting the male component to the female component.

In accordance with another aspect a handheld showerhead comprises a handheld showerhead housing having a showerhead portion and a handle portion, and a female component configured to receive a male component of an associated receiver for releasably coupling the handheld showerhead with the associated receiver The handheld showerhead can include a push-button release mechanism operative to permit or restrict disengagement of the female component from the male component of the associated receiver. The push-button release mechanism can include a pair of jaws configured to engage a surface of the male component of the associated receiver to restrict separation of the handheld showerhead from the associated receiver, the jaws being movable between a closed position and an open position, and/or a biasing member for biasing the pair of jaws towards the closed position. The push-button release mechanism can include a button supported by the handle portion of the handheld showerhead. A flow tube can be supported in the housing of the handheld showerhead, and the flow tube can pass through an opening in the push-button release mechanism. The push-button release mechanism can include a first linkage having a pair of spaced-apart bars at least partially forming the opening through which the flow tube passes. The push-button release mechanism can be coextensive along a major portion of its length with the flow tube. The push-button release mechanism can include an arm supported in the housing of the hand-held showerhead for reciprocating movement in response to depression of the button. A rear surface of the button can be concave such that its shape corresponds to a shape of a surface of the flow tube, whereby the button can be configured to engage the corresponding surface of the flow tube when fully depressed thereby limiting further depression of the button. The button can be on a front side of the handle portion of the handheld showerhead. The handheld showerhead can include a plurality of nozzles, and the button can be on a front side of the handle portion of the handheld showerhead facing in a common direction as the plurality of nozzles. The coupling mechanism can include cooperating magnetic components for attracting the male component to the female component

DETAILED DESCRIPTION

Figure 1:
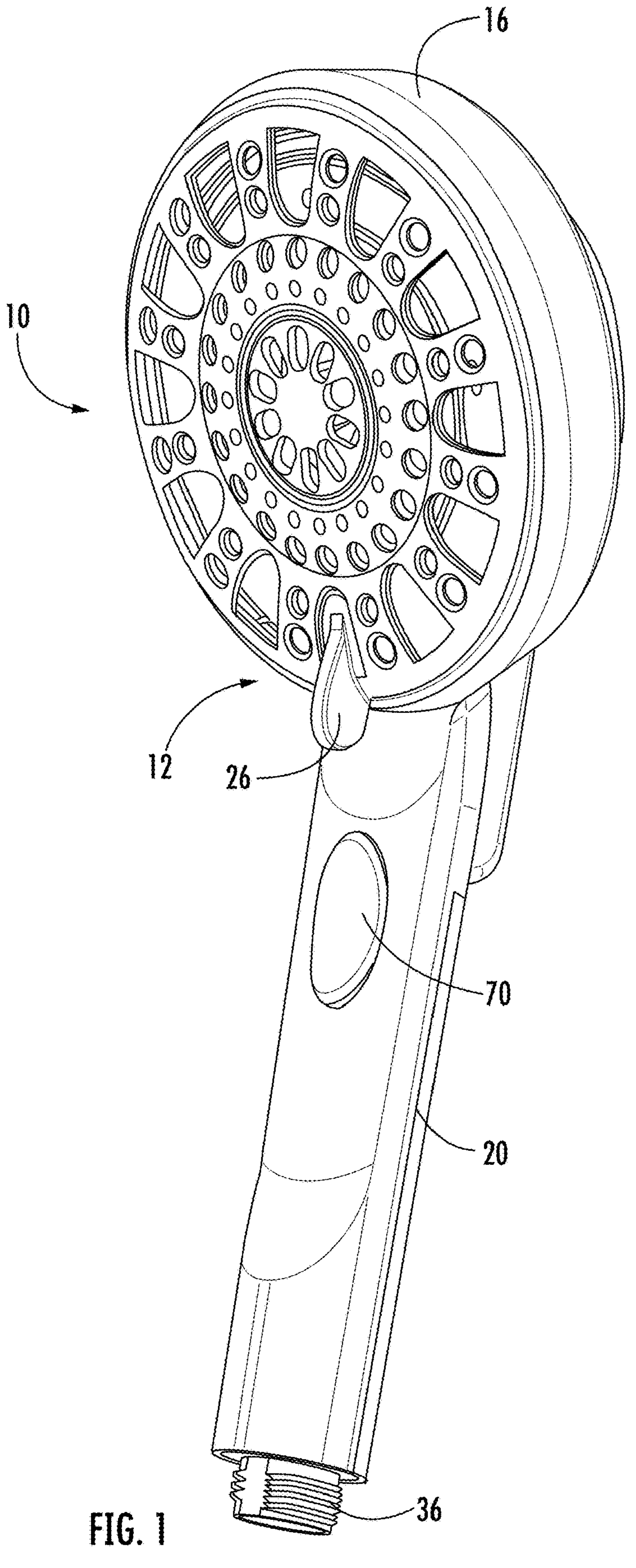
FIG. 1 is a perspective view of an exemplary showerhead in accordance with the present disclosure.
Figure 3:
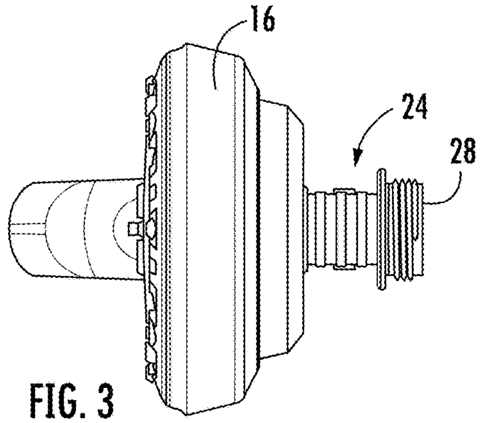
FIG. 3 is a top view of the showerhead of FIG. 1.
Figure 2:
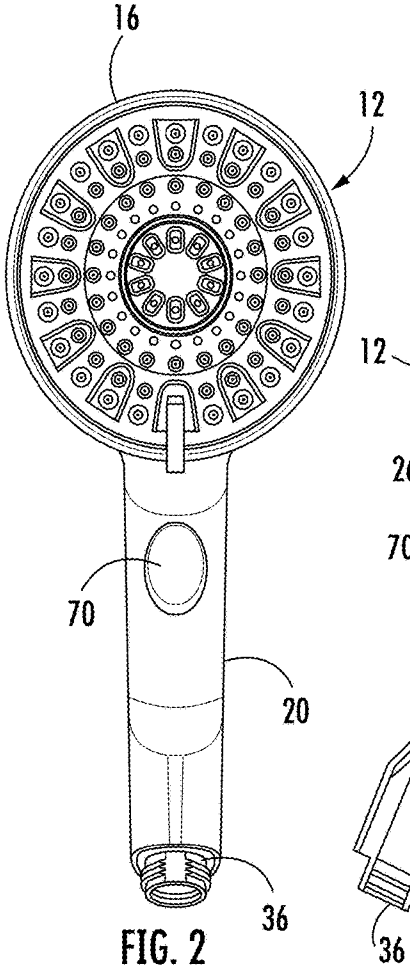
FIG. 2 is a front elevation view of the showerhead of FIG. 1.

Referring now to the drawings in detail, and initially to FIGS. 1-4, an exemplary handheld shower/wand assembly is illustrated and identified generally by reference numeral 10. The handheld shower assembly 10 includes a handheld showerhead 12 having a showerhead portion 16 and a handle portion 20. The handheld showerhead 12 is removably coupled with a receiver 24, which is configured to be mounted to a water supply pipe (not shown) for a shower or the like for positioning the handheld showerhead 12 for directing water on a user. The handheld showerhead 12 can have an adjustable showerhead that provides multiple different types of flow from the showerhead which may be selected by rotation of a selector 26 which functions to block or permit flow through one or more sets of nozzles (not shown) on the face of the showerhead portion 16. It will be appreciated that the configuration of the nozzles and other features of the handheld showerhead 12 are exemplary in nature, and that aspects of the present disclosure are applicable to a wide variety of handheld showerheads.

The receiver 24 generally includes an inlet 28 adapted to be threadedly secured to the supply pipe and an outlet 32 for supplying water from the supply pipe to the handheld showerhead 12. Although not shown in the drawings, outlet 32 is typically attached to a supply hose that connects outlet 32 to an inlet 36 of the handheld showerhead 12. In this manner, the water supplied by the supply pipe can flow through the receiver 24 to the handheld showerhead 12.

Figure 5:
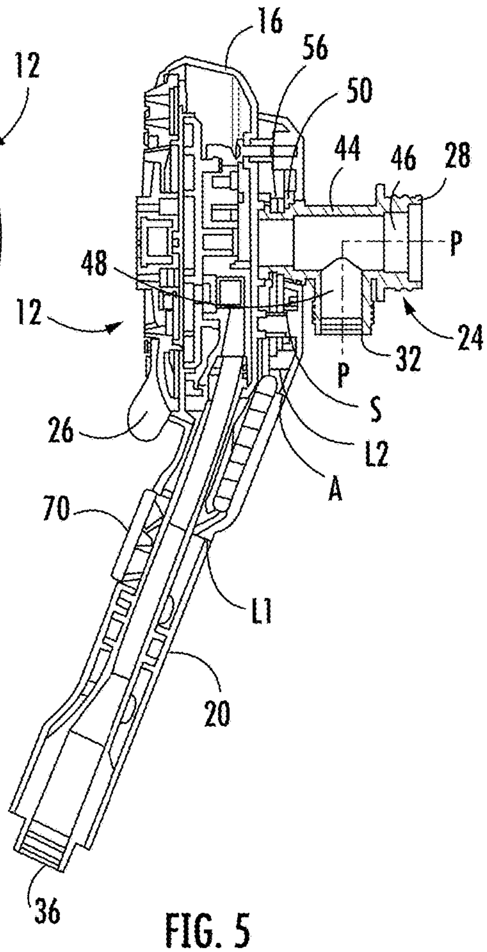
FIG. 5 is a cross-sectional view taken along the line 5-5 in FIG. 4.
Figure 4:
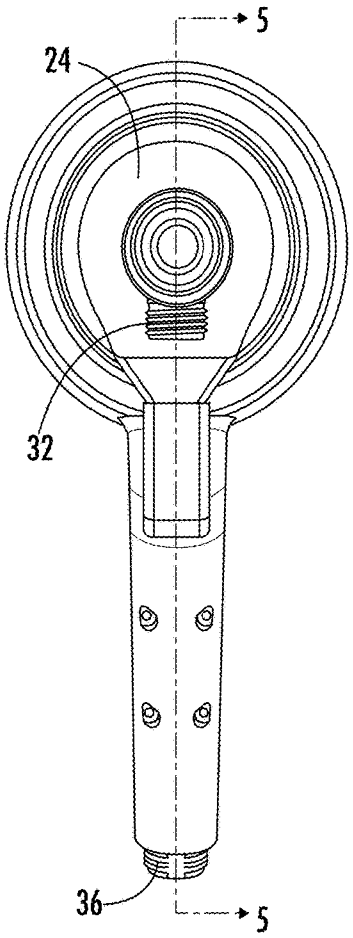
FIG. 4 is a rear elevation view of the showerhead of FIG. 1.
Figure 6:
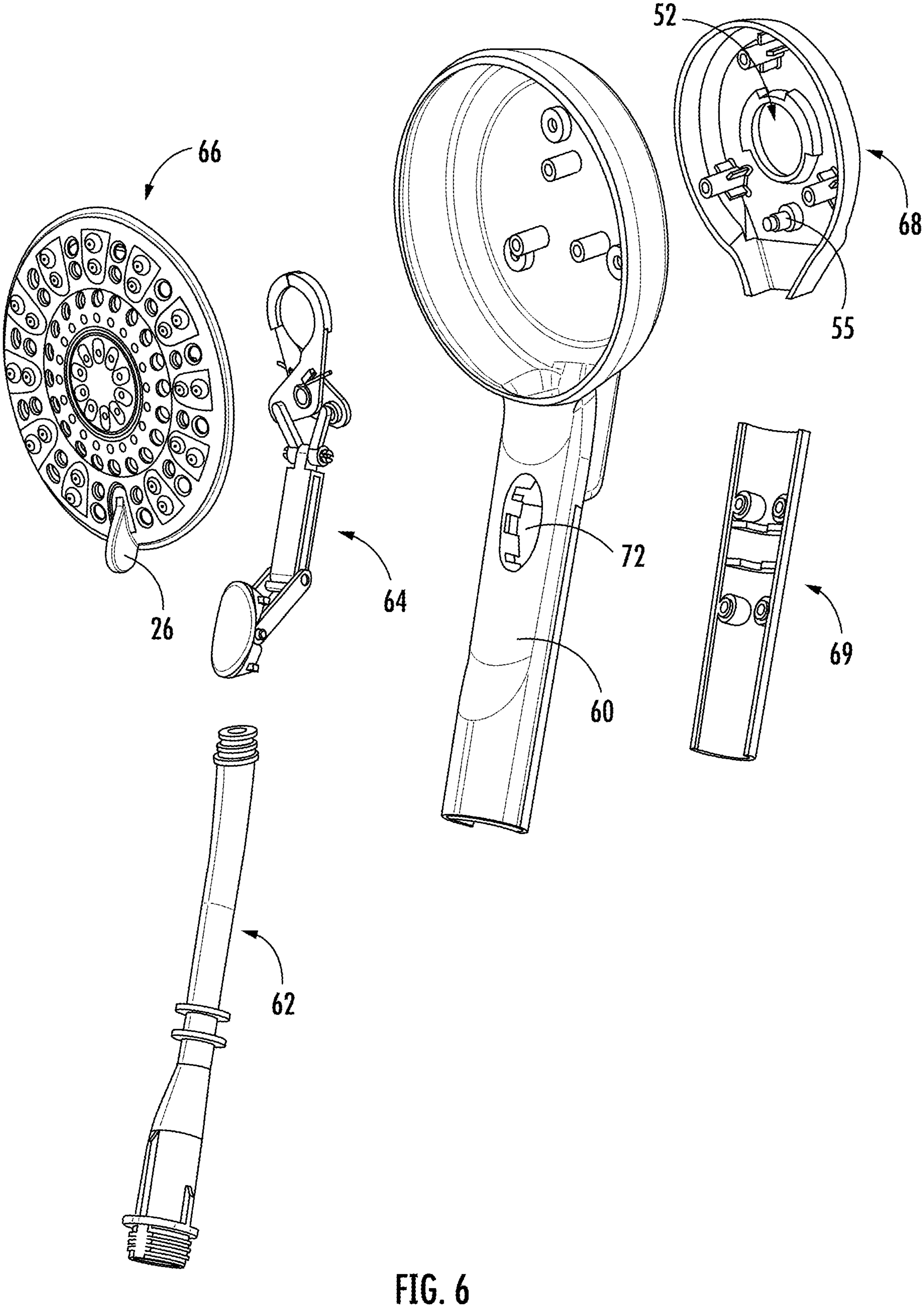
FIG. 6 is an exploded view of the showerhead of FIG. 1.

Turning now to FIG. 5, the internal details of the handheld showerhead 12 and the receiver 24 of the shower assembly 10 will be described. The receiver 24 includes a receiver body 44 having a flow passageway indicated by the line labelled P that extends internally between the inlet 28 and the outlet 32. The flow passageway P is formed by intersecting bores 46/48 within the receiver body 44, which in this embodiment extend at right angles to each other. In some embodiments, the receiver 24 can be integrated in a diverter or other valve assembly configured to divert water between one or more showerheads. In other embodiments, the receiver 24 can be a separate unit mountable to any desired surface (e.g., a shower wall, a shower door, etc.), and may or may not include flow passageways for supplying water to the handheld showerhead 12. In the exemplary embodiment, the receiver 24 includes a protrusion 50 (e.g., male component). The protrusion 50 is configured to be received in a recess of the showerhead 12 for supporting the showerhead 12, as will now be described in connection with the remaining FIGURES.

Turning to FIGS. 6-12, the handheld showerhead 12 is releasably couplable to the receiver 24 by a coupling mechanism that generally includes a male portion, protrusion 50 (associated with the receiver 24), that is configured to be received in a female portion, recess 52 (associated with the showerhead 12). The protrusion 50 has an annular recess 56 that extends circumferentially about an outer diameter of the protrusion 50. In the illustrated embodiment, the protrusion 56 is tapered along its axial length from a larger diameter proximal end to a smaller diameter distal end.

The showerhead 12 of the exemplary embodiment is assembled from several components including a main showerhead body 60, a flow tube 62, a push-button release mechanism 64, a front face 66 having a plurality of nozzles, a rear cover 68 and a rear handle portion cover 69. The push-button release mechanism 64 includes a push-button 70. As will be described below, the push-button 70 is configured to release the showerhead 12 from the receiver 24 when depressed by a user.

Figure 7:
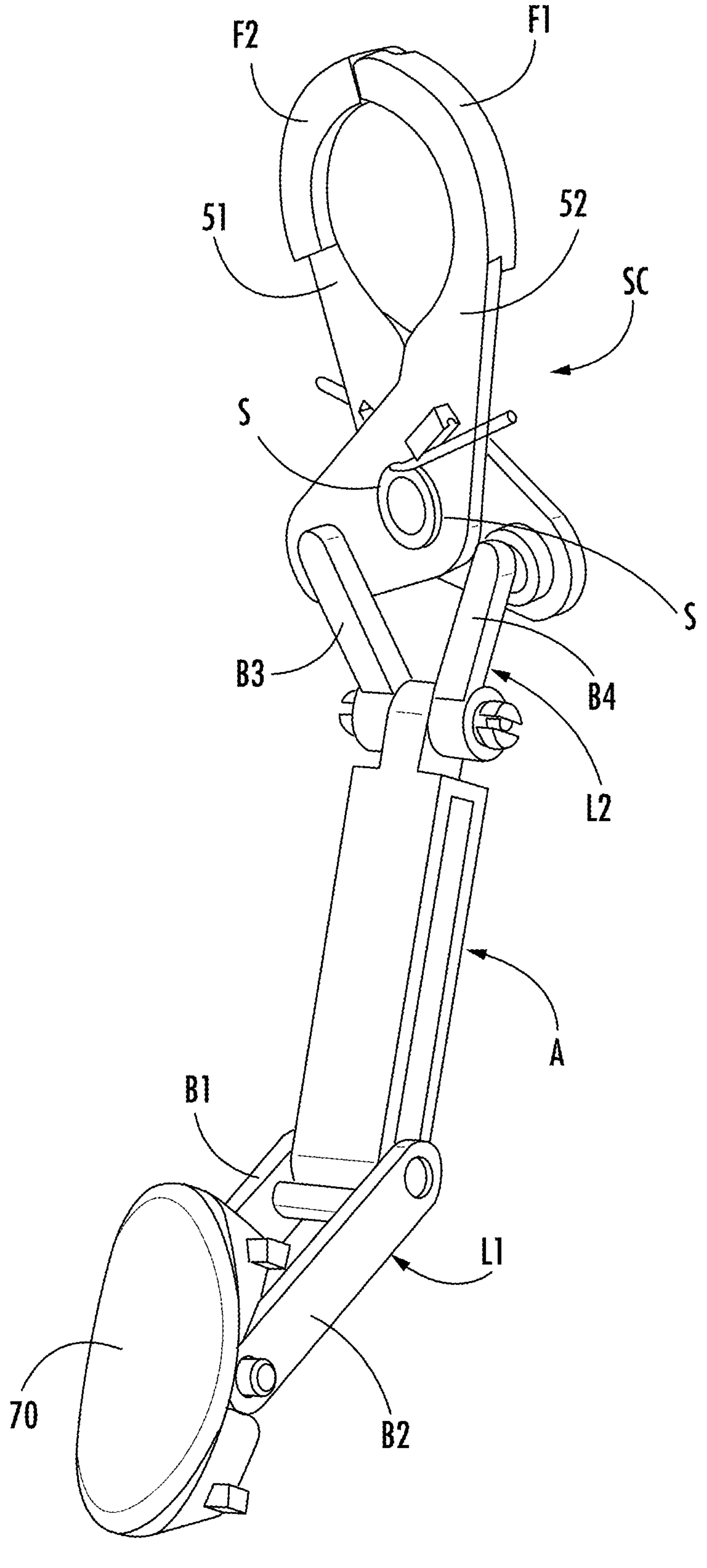
FIG. 7 is a perspective view of the push-button release mechanism in a closed configuration.

Referring back to FIG. 6, the push-button release mechanism 64 and flow tube 62 are supported in the main showerhead body 60. The push-button 70 of the push-button release mechanism 64 is at least partially received in an aperture 72 of the main showerhead body 60 such that the push-button 70 can be actuated by a user. The push-button 70 is coupled to a first linkage L1. Linkage L1 includes spaced-apart bars B1 and B2 that are pivotally connected at first ends thereof to the push-button 70 and pivotally connected at second ends thereof to a first end of an arm A. The flow tube 62 extends through an opening 76 between the spaced-apart bars B1 and B2 of the first linkage L1. A rear surface 80 of the push-button 70 is arcuate such that its shape corresponds to the shape of the flow tube 62. As such, the flow tube 62 serves as a stop against which the push-button 70 bottoms when fully depressed. A second end of arm A is pivotally connected to a second linkage L2. Linkage L2 includes first and second bars B3 and B4. A scissor clamp SC includes a first jaw J1 and a second jaw J2 pivotally joined together at pivot point P. A first end of each jaw J1 and J2 is pivotally attached to a respective bar B3 and B4. A second end of each jaw J1 and J2 includes a flange F1 and F2 adapted to engage the protrusion 50 of the receiver 24 and, in particular, the flanges F1 and F2 are configured to be received in the annular groove 56 of the protrusion 50. A torsion spring S biases the second end of each of jaws J1 and J2 towards each other. In the illustrated embodiment, the coil portion CP of the torsion spring S is supported on a spring support SS of the rear cover 68 (FIG. 6) and serves as an axle about which the jaws J1 and J2 are supported for rotation, with each leg of the torsion spring acting on a respective jaw J1 and J2 to bias the flanges F1 and F2 towards each other (e.g., biased closed), as best seen in FIG. 7.

Figure 8:
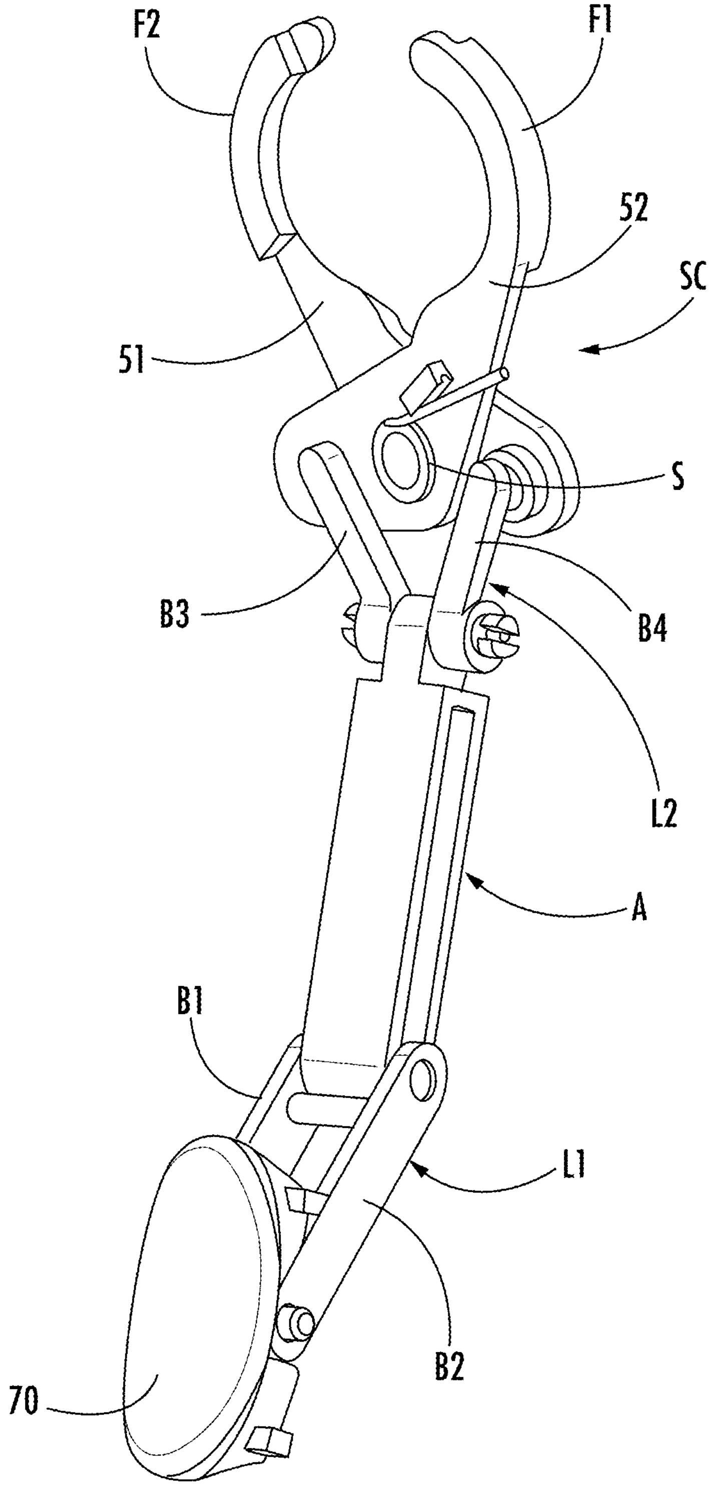
FIG. 8 is a perspective view of the push-button release mechanism in an open configuration.
Figure 9:
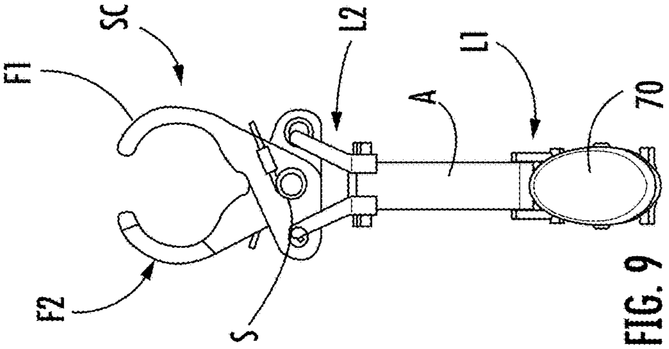
FIG. 9 is a front elevation view of the of the push-button release mechanism of FIG. 8.
Figure 10:
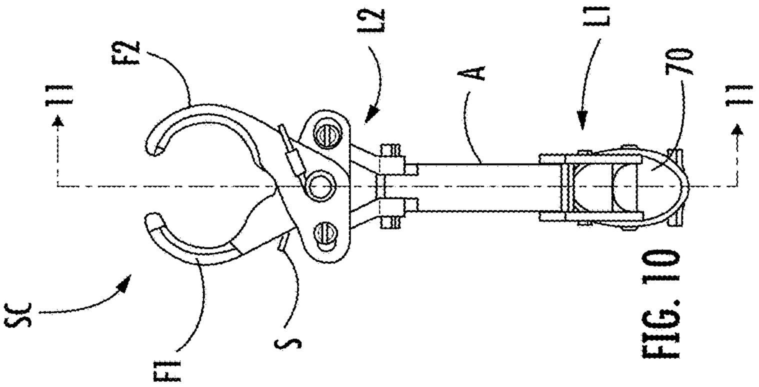
FIG. 10 is a rear elevation view of the push-button release mechanism of FIG. 8.
Figure 11:
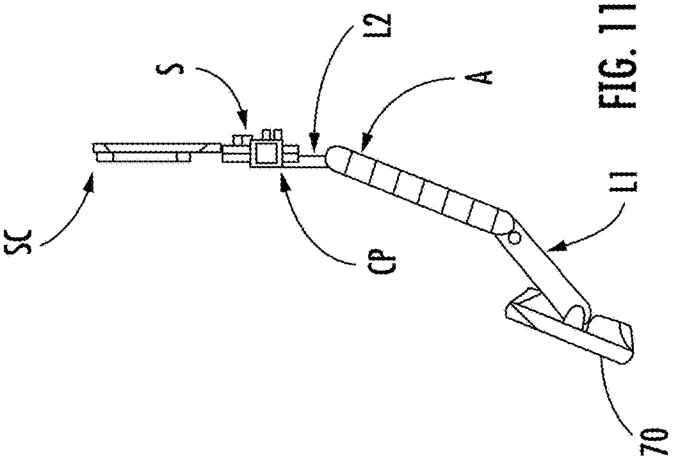
FIG. 11 is a cross-sectional view taken along the line 11-11 in FIG. 10.
Figure 12:
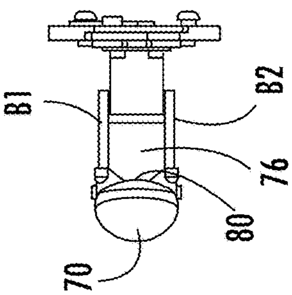
FIG. 12 is a bottom view of the push-button release mechanism of FIG. 8.

As supported within the main showerhead body 60, the arm A of the push-button release mechanism 64 is constrained for axial reciprocating movement along a longitudinal axis of the handle portion 20 of the showerhead 12 when the push-button 70 is depressed. With reference to FIGS. 7 and 8, wherein the push-button mechanism 64 is shown in closed state in FIG. 7 and an open state (e.g., release position) in FIG. 8, it will be appreciated that the depression of the push-button 70 from the position of FIG. 7 to the position of FIG. 8 results in the arm A shifting within the main showerhead body 60 of the showerhead 12 towards the showerhead portion 16 such that bars B3 and B4 actuate the scissor clamp SC to spread the flanges F1 and F2 apart to the position shown in FIG. 8 (e.g., a release position). Upon release of the push-button 70, the torsion spring S returns the scissor clamp SC to the position of FIG. 7. Likewise, the push-button 70 is restored to its undepressed position, for example as shown in FIG. 1.

It should be appreciated that the distal ends of the flanges F1 and F2 include mating profiles such that, when in the closed state, the jaws J1 and J2 engage each other in overlapping fashion. This feature increases the rigidity of the scissor clamp SC for resisting forced separation of showerhead 12 from the receiver 24 (e.g., separation without depression of button 70).

In use, it should be understood that a user will typically grasp the handle portion 20 of the showerhead 12 for removal from the receiver 24. The button 70 is positioned on the handle portion 20 such that the user's thumb will typically naturally fall on the button 70 when the handle portion 20 is grasped. As the user attempts to pull the handheld showerhead 12 away from the receiver 24, depression of the button 70 is intuitive as the position of the button 70 is such that the user may naturally apply force to the button 70 as the handheld showerhead 12 is pulled away from the receiver 24.

When the user wishes to return the handheld showerhead 12 to the receiver, the user simply orients the handheld showerhead such that the protrusion 50 of the receiver 24 is aligned with the recess 52 of the handheld showerhead 12, and applied force to the handheld showerhead 12 to seat the protrusion 50 in the recess 52. The tapered leading end of the protrusion 50 urges the jaws J1 and J2 apart allowing the flanges to settle in the annular groove 56 of the protrusion 50 where they are maintained by the spring S, thereby positively securing the handheld showerhead 12 to the receiver 24.

In the illustrated embodiments, it should be appreciated that the passageway P in the receiver is optional. Accordingly, embodiments are contemplated wherein the passageway P is not present.

Figure 13:
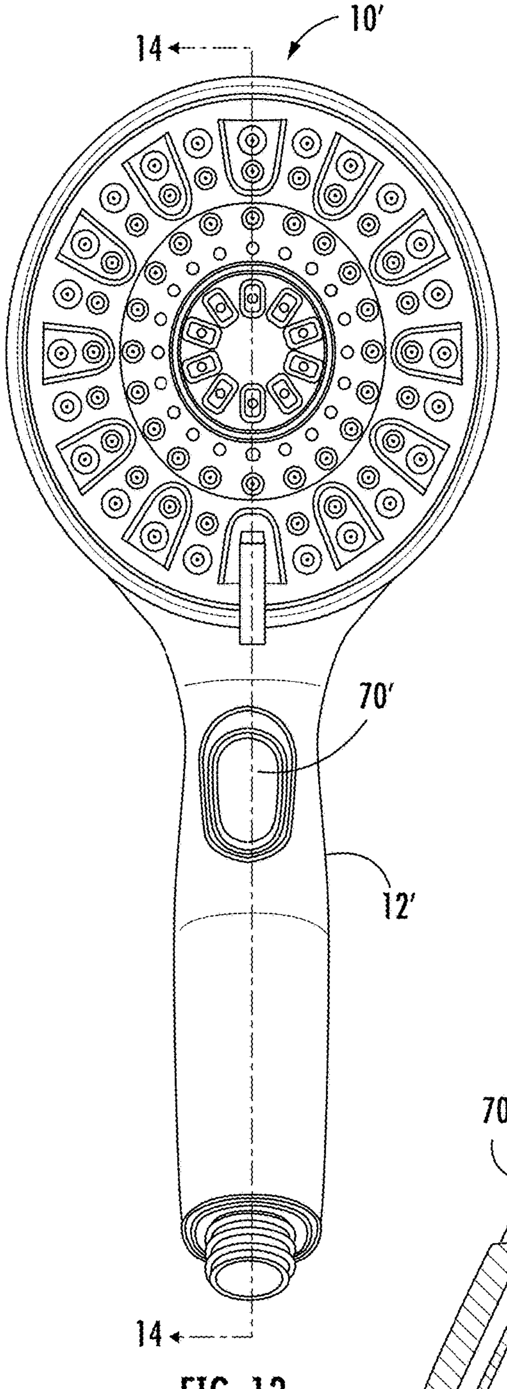
FIG. 13 is a front elevation view of another exemplary showerhead in accordance with the present disclosure.
Figure 14:
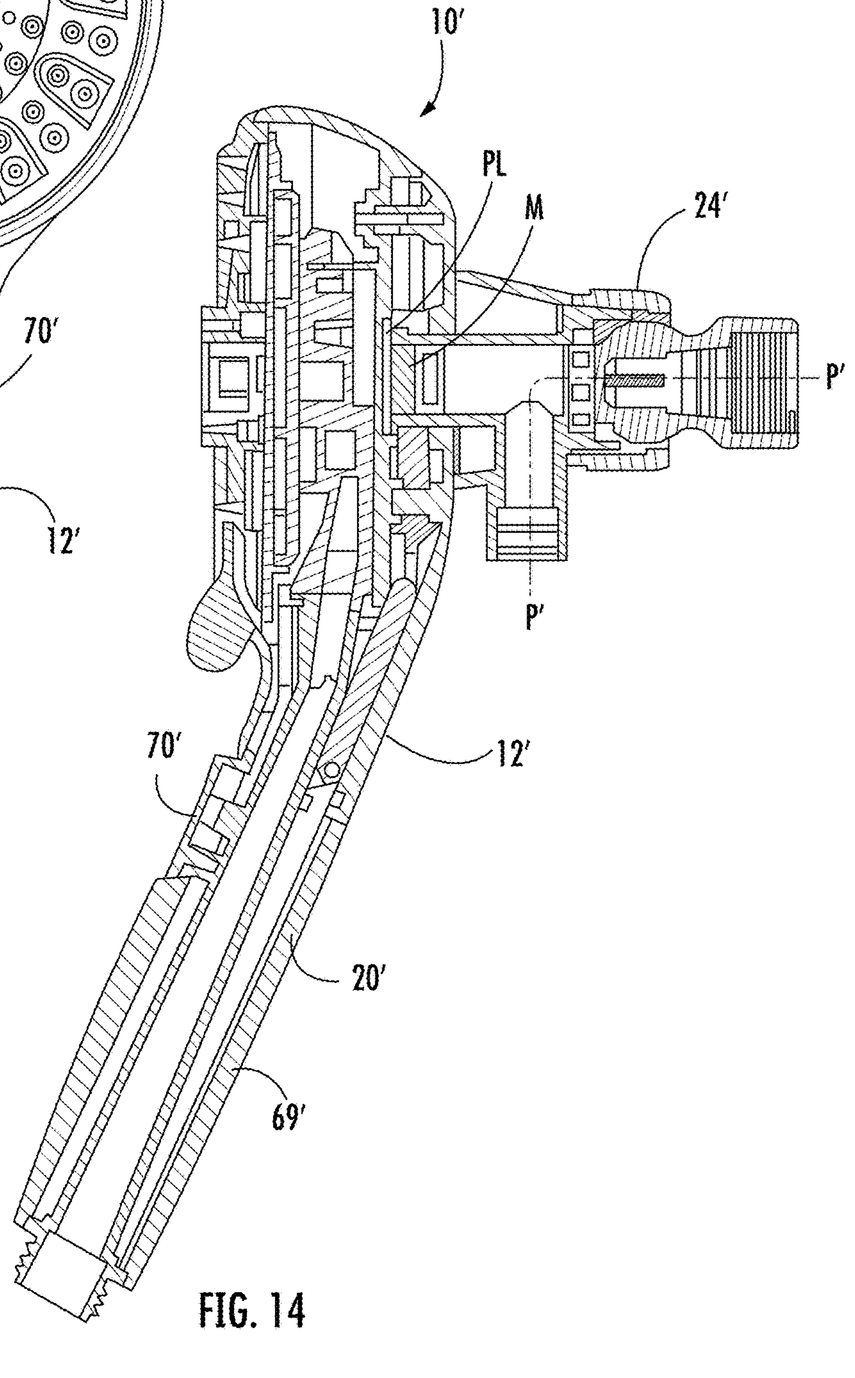
FIG. 14 is a cross-sectional view of the showerhead taken along the line 14-14 in FIG. 13.
Figure 15:
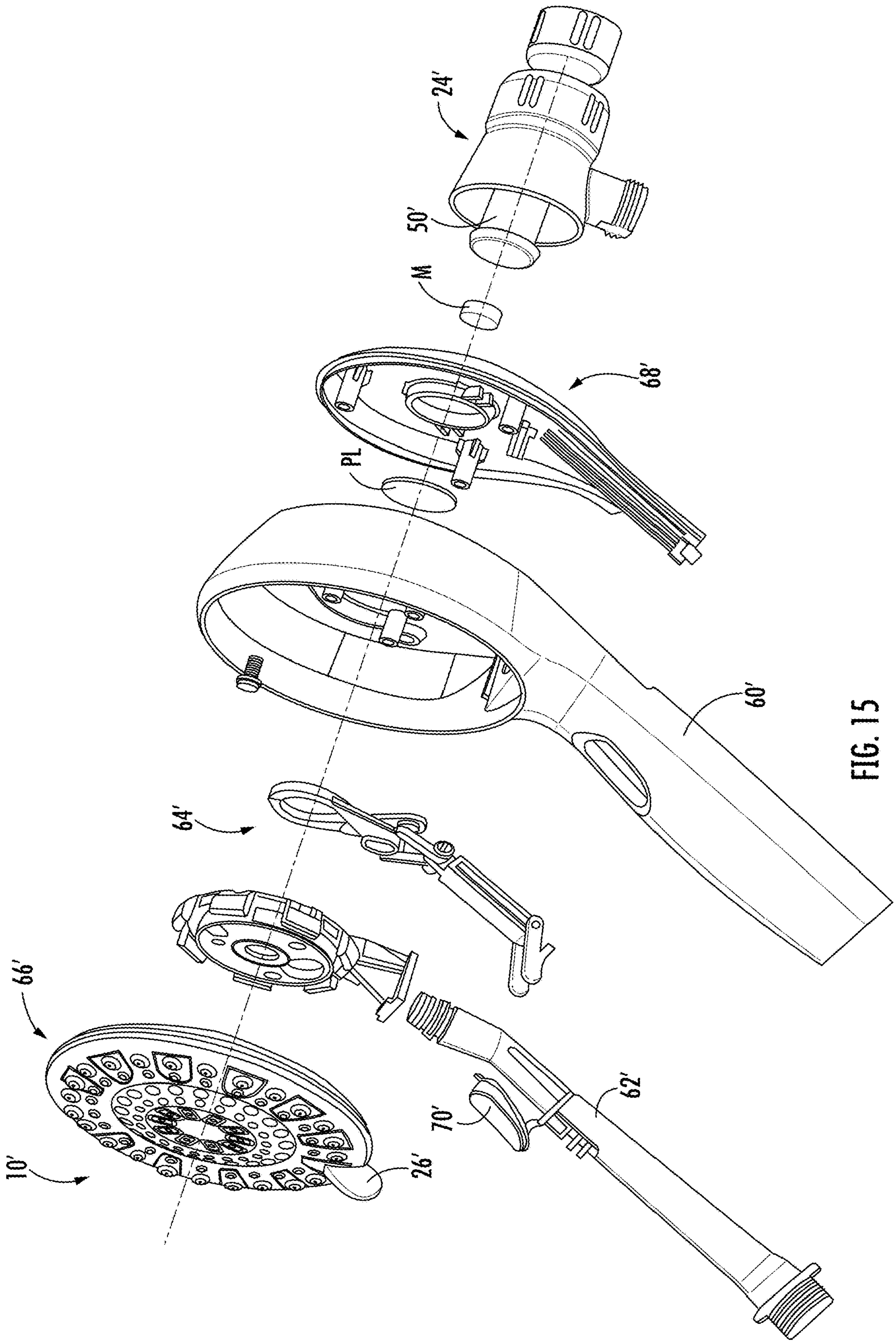
FIG. 15 is an exploded view of the showerhead of FIG. 13.

Turning to FIGS. 13-15, another exemplary embodiment of a showerhead assembly in accordance with the present disclosure is illustrated and identified by reference numeral 10'. It will be appreciated that the showerhead assembly 10' is similar to the showerhead 10 except where noted in the following paragraphs. Accordingly, the reference numerals of common components are denoted by a "prime" in the drawings and description of the showerhead 10'. To the extent any primed reference numeral appears in the drawings but not in the text of the specification, it will be appreciated that such primed reference numerals correspond to the unprimed reference numerals of the embodiment of FIGS. 1-12.

Like the showerhead 10 of FIGS. 1-12, the showerhead assembly 10' includes a showerhead 12' and a receiver 24'. The showerhead 12' of the exemplary embodiment is assembled from several components including a main showerhead body 60', a flow tube 62', a push-button release mechanism 64', a front face 66' having a plurality of nozzles, a rear cover 68' and a rear handle portion cover 69'. The push-button release mechanism 64' includes a push-button 70'. The push-button 70' is configured to release the showerhead 12' from the receiver 24' when depressed by a user in the same manner as the push-button 70 of showerhead 12 described above. It should be appreciated that, although not identical in appearance, the showerhead 12' and receiver 24' generally include all of the components of the showerhead 12 and receiver 24 shown and described in connection with FIG. 1-12.

The showerhead assembly 10' differs from the showerhead assembly 10 in that a magnetic guide feature is provided for assisting alignment of the shower head 12' with the receiver 24' The magnetic guide feature includes magnetic components in the showerhead 12' and the receiver 24' that function to align the showerhead 12' with the receiver 24' as the showerhead 12' is brought into proximity with the receiver 24'.

The magnetic components in the illustrated embodiment include a magnet M supported in the receiver 24' and a ferromagnetic plate PL supported in the showerhead 12'. As will be appreciated other arrangements of magnetic components can be employed including using a pair of magnets of opposite polarity. In one embodiment, the magnetic components exert a force in a coupling direction that is sufficient to be felt by a user, but of a magnitude that is not sufficient to couple the showerhead 12' to the receiver 24'. In another embodiment, the magnetic components exert a force in a coupling direction that is sufficient to maintain the showerhead 12' in a coupled configuration with the receiver 24'.

In the illustrated embodiment, the magnet M is supported in the protrusion 50' of the receiver 24'. In other embodiments, the magnet M can be supported on an exterior of the protrusion 50' or the protrusion 50' or terminal end portion thereof can be made of a magnetic material. The plate PL is supported by the body of the showerhead 12'. The plate PL has a diameter that is greater than the diameter of the magnet M. In the illustrated embodiment, the plate diameter is approximately twice the diameter of the magnet M.

In the exemplary illustrated embodiments, the push-button release mechanism 64 is generally coextensive with and parallel to the flow tube 62. As noted, the flow tube 64 extends through an opening 76 in the first linkage L1 such that the push-button 70 is on a first side of the flow tube 64 and the arm A, second linkage L2, and scissor clamp SC are on an opposite side of the flow tube 64. This configuration provides a more compact arrangement such that the handle portion 20 of the showerhead 12 need not necessarily be enlarged to accommodate the release mechanism.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A handheld shower assembly comprising:

a handheld showerhead;

a receiver mountable to an outlet pipe; and a coupling mechanism for releasably coupling the handheld showerhead with the receiver, the coupling mechanism having cooperating magnetic components for attracting the handheld showerhead to the receiver, a male component and a female component, the male component adapted to be received in a female component, the male component being associated with the receiver and the female component being associated with the handheld showerhead;

wherein the handheld showerhead includes a release mechanism operative to permit separation of the coupling mechanism to allow separation of the handheld showerhead from the receiver, the release mechanism includes, a pair of jaws configured to engage a surface of the male component to restrict separation of the handheld showerhead from the receiver, the jaws being movable between a closed position and an open position, a first linkage having a pair of pivoting spaced-apart bars at least partially forming an opening, and a user-actuated release supported by a handle portion of the handheld showerhead;

wherein a flow tube is supported in the handheld showerhead and passes through the opening in the release mechanism.

2. The handheld shower assembly of claim 1, further comprising a biasing member for biasing the pair of jaws towards the closed position.

3. The handheld shower assembly of claim 1, wherein the release mechanism is coextensive along a major portion of its length with the flow tube.

4. The handheld showerhead assembly of claim 2, wherein the release mechanism includes a push-button.

5. The handheld showerhead assembly of claim 1, wherein the release mechanism includes an arm supported in the housing of the hand-held showerhead for reciprocating movement in response to user activation of the release mechanism.

6. The handheld shower assembly of claim 1, further, comprising:

a showerhead portion having a plurality of nozzles, and wherein the release mechanism further comprises a push-button on a front side of the handle portion of the handheld showerhead facing in a common direction as the plurality of nozzles.

7. The handheld shower assembly of claim 1, wherein the release mechanism comprises a push-button.

8. The handheld shower assembly of claim 7, wherein the release mechanism includes an arm supported in the handheld showerhead for reciprocating movement in response to depression of the push-button.

9. The handheld shower assembly of claim 8, wherein a rear surface of the push-button is concave such that its shape corresponds to a shape of a surface of the flow tube, whereby the push-button is configured to engage the corresponding surface of the flow tube when fully depressed thereby limiting further depression of the push-button.

10. The handheld shower assembly of claim 9, wherein the handheld showerhead includes a plurality of nozzles, and wherein the push-button is on a front side of the handle portion of the handheld showerhead facing in a common direction as the plurality of nozzles.

* * * * *